June 10, 1952     A. F. WIRTEL ET AL     2,599,682
METHOD, APPARATUS FOR MAKING COFFEE BEVERAGES
Filed May 11, 1946
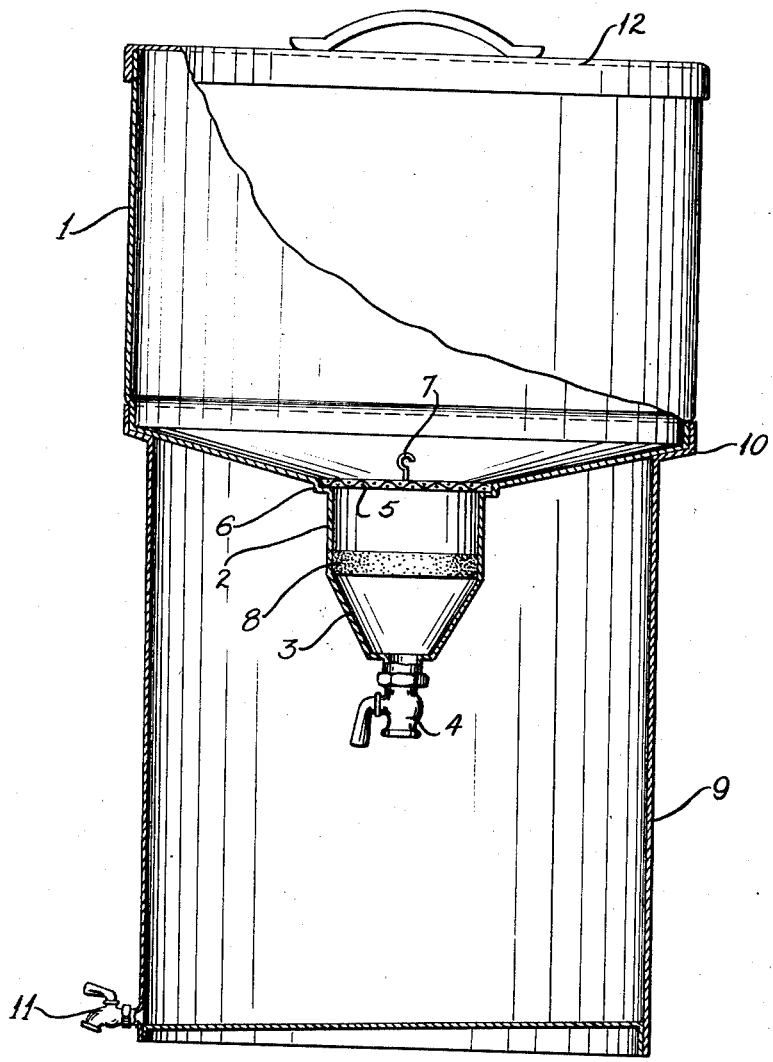
INVENTORS:
ARTHUR F. WIRTEL
ERWIN KNOESEL
BY Rodney Beadel
ATTORNEY Patented June 10, 1952

2,599,682

UNITED STATES PATENT OFFICE 2,599,682

METHOD, APPARATUS FOR MAKING COFFEE BEVERAGES

Arthur F. Wirtel and Erwin Knoesel, Glendale, Mo.

Application May 11, 1946, Serial No. 669,137

7 Claims. (Cl. 99—71)

The invention relates to the production of a coffee extract and coffee beverage.

The principal object of the invention is to provide a method and an apparatus for producing and storing a coffee extract which can be made into coffee beverage of high quality by adding water thereto. It is an object to retain the desired natural flavor and aroma of the coffee and eliminate or render ineffective certain objectionable taste, aroma and appearance characteristics ordinarily present in coffee beverage.

Another object of the invention is to produce an aqueous coffee extract which may be kept for an indefinite period and may be stored in frozen condition and which does not decompose when frozen.

All constituents of roasted coffee which contribute to the desirable taste, aroma and inviting appearance of coffee beverage are soluble in cold water. Some substances, in the form of colloidal matter, harmful to the aroma, taste or appearance of the finished beverage, also are soluble in cold water and other harmful substances are soluble only in hot water. Some of these substances, ordinarily soluble in cold water, when frozen at a temperature of approximately 32° F., become insoluble and do not redissolve again at higher temperatures. Other substances, not initially objectionable and soluble in cold water, upon standing in water for prolonged periods of time at temperatures moderately above 45° F., hydrolize or otherwise react chemically to form products which are objectionable in the finished coffee beverage.

The method described herein results in an extract which will produce a beverage with all the desirable coffee flavor and aroma characteristics. The method excludes or removes from the extract all the objectionable substances mentioned above except the last-mentioned substances and those are prevented from hydrolizing or reacting chemically to form harmful products by storing the coffee extract at temperatures below 50° F., preferably below 45° F. The harmful substances soluble only in hot water are not extracted from the coffee when cold extraction is used. Certain objectionable substances, including the substances which decompose when frozen, and which are soluble in cold water, are removed from the extract liquor by passing the liquor through a porous silica member having adsorption qualities.

The drawing is a transverse vertical section of the apparatus for carrying out the method.

The apparatus comprises a substantially cylindrical container 1, made of aluminum, stainless steel, nickel, nickel-plated copper, ceramic materials, glass, plastic, or other suitable material. The container has an annular member 2 of smaller diameter than the container extending downwardly from the bottom of the container and terminating in a funnel-shaped part 3 having a valve 4 in the lowermost part thereof. A screen 5 of thirty or forty mesh is positioned at the bottom of container 1 and rests on a ledge 6 formed in annular member 2. A hook 7 on screen 5 facilitates removal of the screen from the container. Positioned in and preferably cemented rigidly to annular member 2 is an element 8 commonly referred to in the trade as artificial porous stone, as described in detail below.

A cylindrical reservoir 9, preferably of the same material as container 1 and adapted to receive the extract as it flows from container 1 through valve 4, has an annular ridge 10 at the top to receive container 1. Reservoir 9 has a valve 11 in the side near the bottom to facilitate withdrawal of the extract from the reservoir. A cover 12 fits on container 1 and on reservoir 9 when container 1 is removed therefrom.

An artificial porous stone suitable for removing the undesirable substances mentioned above has a practically uniform structure throughout analogous to a mass of capillary tubes, which take a tortuous rather than a direct path through the stone. Preferably it is of a white rigid, porous mineral substance chemically inert, composed essentially of silica, its porosity being controlled in manufacture so that the stone has from 33% to 37% pore space by volume and an effective pore diameter of from .010 to .012 inch. The preferred thickness of porous stone 8 is in the neighborhood of one-half inch. In general, each pound of coffee extracted in one operation requires two to six cubic inches of porous stone having a top face area in square inches of about twice the volume in cubic inches.

The apparatus is used as follows:

One pound of drip or percolator ground coffee, thoroughly mixed with about two quarts of cold water at a temperature of approximately 45° F., is placed in container 1, valve 4 being closed. The apparatus is placed in a refrigerator for six to twelve hours to maintain the temperature of the contents at or below 45° F. During this time, some of the liquor extract passes through stone 8 and fills funnel-shaped part 3. At the end of this time, valve 4 is opened and the remaining aqueous extract passes through stone 8 and all the extract drains through valve 4 into reservoir 9. The bulk of the coffee grounds are filtered from the aqueous extract by screen 5 and the small amount of finely ground coffee which passes through screen 5 is filtered from the solution by stone 8 which adsorbs undesirable colloidal matter as described above. When the extraction is completed and all the extract has passed into the reservoir, container 1 may be removed from the reservoir and the reservoir may be covered with cover 12, and be stored in the refrigerator for an indefinite period. Or the extract may be withdrawn from the reservoir through valve 11 into a suitable container and be frozen into small cubes in ordinary refrigerator trays, or into larger cubes such as pint or quart packages, or into crushed ribbons of flake-like appearance. The extract either before or after freezing may be stored indefinitely.

Coffee beverage is made from the extract by adding hot or cold water thereto to make hot or iced coffee as desired. Of course, if iced coffee is made, then the frozen extract may be used to chill the water.

After considerable usage, perhaps 10 to 20 times, the porous stone adsorbs certain objectionable ingredients and becomes exhausted and must be cleaned and reactivated. This is apparent by a noticeable deterioration in the aroma, flavor, or appearance of the extract. It is not sufficient merely to remove material adhering to the surface of the stone. The stone must be reactivated to continue to function as an adsorption medium. This is accomplished by passing one quart of 2% solution of soda bicarbonate through the stone. Since the reactivating effect depends on the mild alkalinity of the soda bicarbonate solution, other alkalies can be used for this purpose, such as potassium bicarbonate or ammonium bicarbonate, but substances not harmful to food products should be selected.

Since screen 5 merely supports the bulk of the coffee grounds, some other means, such as cloth sack, may be employed for this purpose and the sack may be suspended from a hook in container 1 or on cover 12. It may be desirable to use an ordinary filter of paper, felt or other material, in addition to the "artificial porous stone," to remove the coffee grounds so that the "stone" serves as an adsorbent only.

The apparatus shown may be used in the home in an ordinary household refrigerator, but the method is suitable to commercial use also by using apparatus similar to that disclosed, but larger in size. During the extraction procedure, the aqueous extract could be agitated to insure thorough mixing of the coffee and water, and the extract could be thoroughly removed from the coffee grounds when the extraction is complete by pressure or suction applied to the grounds.

The method and apparatus disclosed extracts from the ground coffee all the constituents contributing to the desirable taste, aroma, and appearance of the coffee beverage. Certain substances, in the form of colloidal matter, harmful to either the taste, aroma or appearance of the coffee beverage are excluded from the extract. Substances not initially objectionable, but which hydrolize or otherwise react chemically upon standing in the presence of water for prolonged periods of time at temperatures moderately above 45° F. to produce harmful substances, although present in the extract, are rendered harmless by performing the extraction and storing the finished extract at temperatures below 45° F. The finished extract may be frozen and when melted, is completely soluble.

As indicated above, the details of the method and apparatus may be varied substantially to produce an extract having the characteristics described without departing from the spirit of the invention and the exclusive use of novel methods and structure as described and coming within the scope of the claims is contemplated.

What is claimed is:

1. The method of producing an aqueous coffee extract for making coffee beverage comprising mixing ground roasted coffee with cold water, maintaining the mixture at a temperature below 50° F., and passing the extract liquor through porous artificial chemically inert stone having an effective pore diameter varying from .010 to .012 inch.

2. The method of producing an aqueous coffee extract for making coffee beverage, comprising mixing ground roasted coffee and cold water in the ratio of one pound of coffee to 3 to 5 pints of cold water, and passing the extract liquor through porous artificial chemically inert stone having an effective pore diameter varying from .010 to .012 inch.

3. A device for producing a coffee extract comprising a container to receive a mixture of ground roasted coffee and water, an artificial porous chemically inert stone arranged to pass the extract liquor therethrough and having from 33% to 37% of porous space by volume with the effective pore diameter varying from .010 to .012 inch, there being approximately 2 to 6 cubic inches of porous stone available for each pound of coffee which the container may hold for extraction in one operation, the volume of said stone in cubic inches being approximately one-half the area of the top face of said stone in square inches, and a reservoir to receive said extract after passing through said artificial porous stone.

4. The method of producing a taste-acceptable aqueous coffee extract for making coffee beverage, comprising mixing ground roasted coffee and cold water at a temperature of approximately 45° F. in the ratio of one pound of coffee to three to five pints of cold water, maintaining the mixture at a temperature of approximately 45° F. for a period of approximately six to twelve hours, passing the extract liquor through a mild alkali reactivatable porous artificial chemically inert silica colloid-absorbing stone, having from 33% to 37% of pore space by volume and having an effective pore diameter varying from .010 to .012 inch, said artificial silica stone having a practically uniform structure throughout analogous to a mass of tortuous capillary tubes, and said artificial silica stone having a thickness of approximately one-half inch and having two to six cubic inches of porous stone available for each pound of coffee extracted in one operation.

5. The method of producing an aqueous coffee extract for making coffee beverage comprising mixing ground roasted coffee with cold water, maintaining the mixture at a temperature below 50° F., and passing the extract liquor through porous stone having an effective pore diameter varying from .010 to .012 inch.

6. The method of producing an aqueous coffee extract for making coffee beverage, comprising mixing ground roasted coffee and cold water in the ratio of one pound of coffee to 3 to 5 pints of cold water, and passing the extract liquor through porous stone having an effective pore diameter varying from .010 to .012 inch.

7. A device for producing a coffee extract comprising a container to receive a mixture of ground roasted coffee and water, porous stone arranged to pass the extract liquor therethrough and having from 33% to 37% of porous space by volume with the effective pore diameter varying from .010 to .012 inch, there being approximately 2 to 6 cubic inches of porous stone available for each pound of coffee which the container may hold for extraction in one operation, the volume of said stone in cubic inches being approximately one-half the area of the top face of said stone in square inches, and a reservoir to receive said extract after passing through said artificial porous stone.

ARTHUR F. WIRTEL.
ERWIN KNOESEL.

REFERENCES CITED

The following references are of record in the file of this patent:

UNITED STATES PATENTS

| Number | Name | Date |
|---|---|---|
| Re. 7,883 | Miller | Sept. 11, 1877 |
| 1,016,294 | Rosewater | Feb. 6, 1912 |
| 1,117,601 | Porter | Nov. 17, 1914 |
| 1,195,487 | Maignen | Aug. 22, 1916 |
| 1,489,893 | Malcamp | Apr. 8, 1924 |
| 1,624,606 | Lane | Apr. 12, 1927 |
| 1,669,362 | Watson | May 8, 1928 |
| 1,822,238 | Albanese | Sept. 8, 1931 |
| 1,891,383 | Giffen et al. | Dec. 20, 1932 |
| 1,933,049 | Copes | Oct. 31, 1933 |
| 2,084,839 | Dubois | June 22, 1937 |
| 2,110,732 | Kane | Mar. 8, 1938 |
| 2,116,308 | Gore | May 3, 1938 |
| 2,250,858 | Ducat | July 29, 1941 |
| 2,285,930 | Kahan | June 9, 1942 |
| 2,338,608 | Weisberg | Jan. 4, 1944 |
| 2,375,550 | Grossman | May 8, 1945 |
| 2,416,945 | Noyes | Mar. 4, 1947 |

FOREIGN PATENTS

| Number | Country | Date |
|---|---|---|
| 52,802 | Denmark | Mar. 8, 1937 |